United States Patent
Zehler

(10) Patent No.: US 10,491,782 B1
(45) Date of Patent: Nov. 26, 2019

(54) METHOD AND APPARATUS TO PREVENT REPRODUCTION OF SECURE DATA

(71) Applicant: Xerox Corporation, Norwalk, CT (US)

(72) Inventor: Peter J. Zehler, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/007,649

(22) Filed: Jun. 13, 2018

(51) Int. Cl.
*H04N 1/44* (2006.01)
*G06F 3/12* (2006.01)
*H04L 9/30* (2006.01)

(52) U.S. Cl.
CPC ......... *H04N 1/4433* (2013.01); *G06F 3/1222* (2013.01); *G06F 3/1238* (2013.01); *H04N 1/4486* (2013.01); *H04L 9/30* (2013.01)

(58) Field of Classification Search
CPC .. H04N 1/4433; H04N 1/4486; G06F 3/1222; G06F 3/1238; H04L 9/30
See application file for complete search history.

(56) References Cited

U.S. PATENT DOCUMENTS

| 2008/0137749 A1* | 6/2008 | Tian | G06T 1/0021 375/240.19 |
| 2008/0292189 A1* | 11/2008 | Morimoto | G06K 9/6211 382/181 |
| 2015/0319138 A1* | 11/2015 | Yan | H04L 63/145 726/11 |
| 2015/0339486 A1* | 11/2015 | Shetye | G06F 21/6218 726/28 |
| 2018/0088872 A1* | 3/2018 | Nishimura | G06F 3/123 |

* cited by examiner

*Primary Examiner* — Iriana Cruz

(57) ABSTRACT

A method, non-transitory computer readable medium, and apparatus for preventing reproduction of secure data on a multi-function device are disclosed. The method may be performed by a processor of a multi-function device. For example, the method receives a request to reproduce a document, calculates a perceptual hash of the document, transmits the perceptual hash of the document to a server, receives a control signal to halt reproduction of the document on the printing device in response to a perceptual hash of the secure data stored on the server matching at least a portion of the perceptual hash of the document, and halts the reproduction of the document on the printing device in response to the control signal.

20 Claims, 4 Drawing Sheets

METHOD AND APPARATUS TO PREVENT REPRODUCTION OF SECURE DATA

The present disclosure relates generally to printing devices and, more particularly, to a method and an apparatus to prevent a printing device from printing secure data.

BACKGROUND

Secure information can be contained in documents. Some individuals or companies may not want the secure information to be printed or reproduced in any way. Some security methods may be manually performed. For example, an analyst may examine every document before the document is reproduced to ensure that no secure data is in the document.

Other methods may use a login and password to reproduce secure data. For example, users with authorized access to the secure data in a document may enter a password in the multi-function device (MFD) to reproduce the document containing the secure data.

In most instances, the security requires some level of user interaction or input from a user at the MFD. In addition, most methods attempt to limit reproduction by attaching some security to the document. However, if the secure data is in other documents that do not include any security feature, the secure data can still be reproduced.

SUMMARY

According to aspects illustrated herein, there are provided a method, a non-transitory computer readable medium, and an apparatus for preventing reproduction of secure data on a printing device. One disclosed feature of the embodiments is a method that is performed by a processor of a multi-function device. The method receives a request to reproduce a document, calculates a perceptual hash of the document, transmits the perceptual hash of the document to a server, receives a control signal to halt reproduction of the document on the printing device in response to a perceptual hash of the secure data stored on the server matching at least a portion of the perceptual hash of the document, and halts the reproduction of the document on the printing device in response to the control signal.

Another disclosed feature of the embodiments is a non-transitory computer-readable medium having stored thereon a plurality of instructions, the plurality of instructions including instructions which, when executed by a processor, cause the processor to perform a method that receives a request to reproduce a document, calculates a perceptual hash of the document, transmits the perceptual hash of the document to a server, receives a control signal to halt reproduction of the document on the printing device in response to a perceptual hash of the secure data stored on the server matching at least a portion of the perceptual hash of the document, and halts the reproduction of the document on the printing device in response to the control signal.

Another disclosed feature of the embodiments is an apparatus comprising a processor that is configured to receive a request to reproduce a document, calculate a perceptual hash of the document, transmit the perceptual hash of the document to a server, receive a control signal to halt reproduction of the document on the printing device in response to a perceptual hash of the secure data stored on the server matching at least a portion of the perceptual hash of the document, and halt the reproduction of the document on the printing device in response to the control signal.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to prevent reproduction of secure data. As discussed above, secure information can be contained in documents. Some individuals or companies may not want the secure information to be printed or reproduced in any way. Some security methods may be manually performed. For example, an analyst may examine every document before the document is reproduced to ensure that no secure data is in the document.

Other methods may use a login and password to reproduce secure data. For example, users with authorized access to the secure data in a document may enter a password in the multi-function device (MFD) to reproduce the document containing the secure data.

In most instances, the security requires some level of user interaction or input from a user at the MFD. In addition, most methods attempt to limit reproduction by attaching some security to the document. However, if the secure data is in other documents that do not include any security feature, the secure data can still be reproduced.

Embodiments of the present disclosure configure a printing device to automatically detect secure data in a document and prevent reproduction of the secure data. In one embodiment, a perceptual hash can be applied to the secure data. The perceptual hash can be stored in a backend server. When a printing device prepares to print a document, the printing device may calculate the perceptual hash of the document. The perceptual hash of the document can be sent to the backend server to determine if any portion of the perceptual hash of the document matches the perceptual hash of the secure data. If a match is found, the backend server may send a control signal to the printing device to prevent reproduction of the document containing the secure data. As a result, the printing device may be configured to automatically prevent reproduction of any secure data that may be contained in any document.

Figure 1:
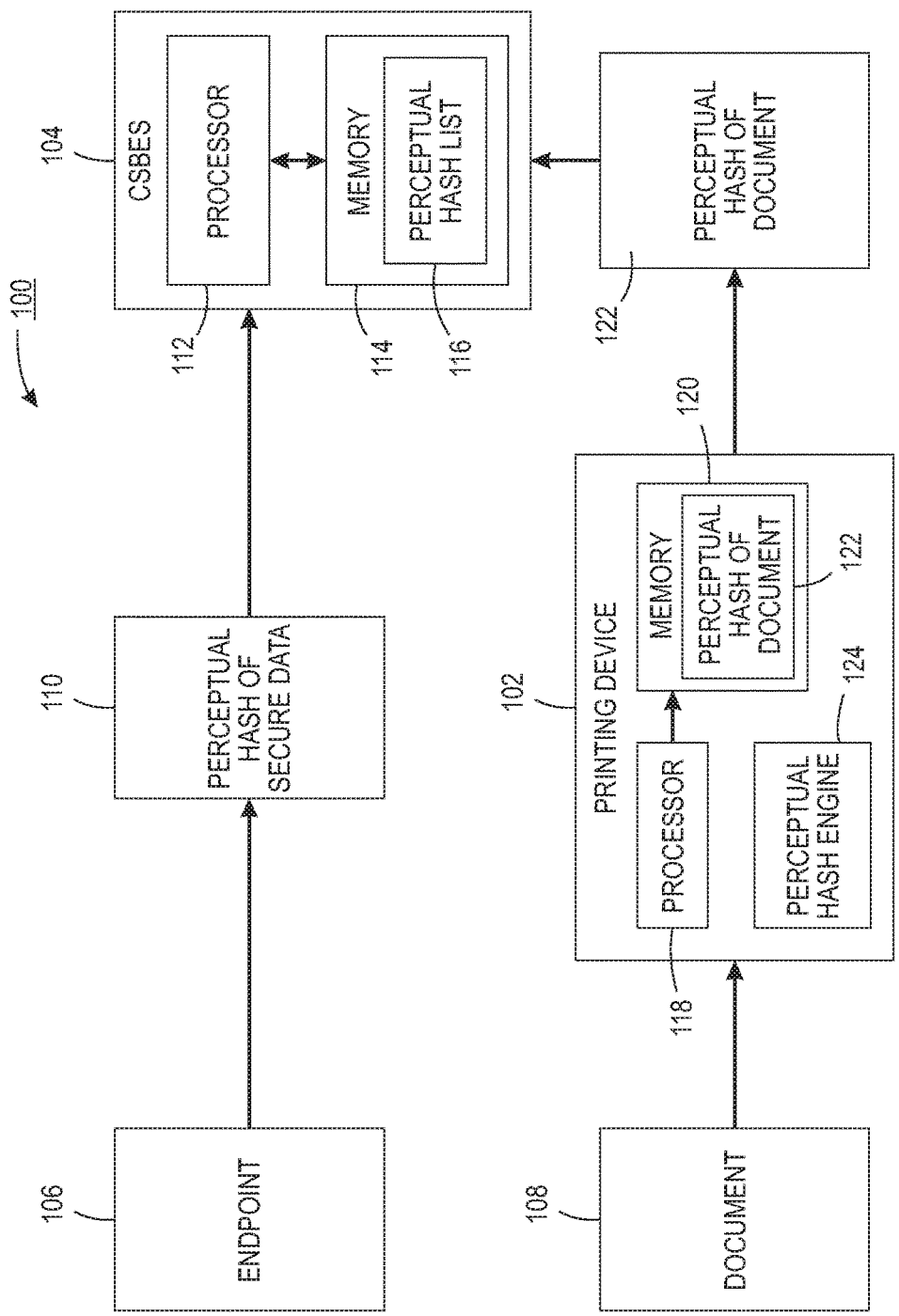
FIG. 1 illustrates one example of a communication network of the present disclosure.

To better understand the present disclosure, FIG. 1 illustrates an example of a communication network 100. In one embodiment, the communication network 100 includes a printing device 102, a server 104, and an endpoint device 106. The printing device 102, the server 104, and the endpoint device 106 may establish a wired or wireless connection with one another over an Internet protocol (IP) network. The IP network may be local area network (LAN) or a wide area network (WAN). Some connections may be over a LAN and other connections may be over a WAN. For example, the printing device 102 and the endpoint device 106 may be in a same geographic location and communicate over a LAN. The server 104 and the printing device 102 may be remotely located (e.g., different buildings or geographic locations) and communicate over a WAN.

Although a single printing device 102, a single endpoint device 106, and a single server 104 are illustrated in FIG. 1, it should be noted that any number of printing devices 102, endpoint devices 106, and servers 104 may be deployed. For example, the server 104 may be in communication with a plurality of different printing devices 102 associated with different geographic locations or customers. In addition, a plurality of endpoint devices 106, at the same location or different locations, may be in communication with the server 104.

In one embodiment, the printing device 102 may be any type of printing device capable of establishing a communication path with the server 104. The printing device 102 may be a multi-function device (MFD), a printer, a scanning device, and the like.

In one embodiment, the server 104 may be a content security back-end system (CSBES) server. The CSBES server may be preconfigured to perform the functions described herein.

In one embodiment, the endpoint device 106 may be any type of endpoint device. For example, the endpoint device 106 may be a desktop computer, a laptop computer, a tablet computer, a smart phone, and the like. The endpoint device 106 may execute an application to allow a user to generate a perceptual hash of secure data 110. The secure data may include any type of text, numbers, images, graphics, pictures, or any combination thereof, that can be generated in a document.

In one embodiment, a perceptual hash is a method to transform an image into a series of binary bit values that provide an efficient way to compare two images and determine if the images are similar. For example, an image may be converted into a greyscale image or halftone image. The average color value of the pixels in the entire image may be calculated. Then the color value of each pixel of the image may be compared to the average color value of the pixels. If the color value of the pixel is below the average color value, the pixel may be assigned a value of zero. If the color value of the pixel is above the average color value, the pixel may be assigned a value of one. Thus, the image may be converted into a sequence of binary bit values of zeros and ones.

In one embodiment, the endpoint device 106 may transmit the perceptual hash of secure data 110 to the server 104. In one embodiment, the endpoint device 106 may have a public key of the server 104. The perceptual hash of secure data 110 may be encrypted with the public key for security. In one embodiment, the perceptual hash of secure data 110 may also be converted or compressed to save memory space. For example, a sequence of binary bit values of zeros and ones of the perceptual hash of secure data 110 may be converted into a hexadecimal value.

In one embodiment, the server 104 may include a processor 112 and a memory 114. The processor 112 may execute instructions stored on the memory 114. The memory 114 may be any type of non-transitory computer readable memory such as a hard disk drive, a random access memory (RAM), an external disk drive, solid state drive, and the like.

It should also be noted that the server 104 has been simplified for ease of explanation. For example, the server 104 may include additional components that are not shown. For example, the server 104 may include a communication interface, a display, input/output devices, and the like.

In one embodiment, the memory 114 may include a perceptual hash list 116. The perceptual hash list 116 may include a plurality of the perceptual hashes of secure data 110 that are indexed. The perceptual hash list 116 may store the perceptual hash of secure data 110 for different types of secure data received from different endpoint devices 106. The perceptual hash list 116 may be used to provide an automated way to ensure that secure data is not reproduced on the printing device 102. Thus, any portion of a document 108 that contains secure data found in the perceptual hash list 116 may be prevented from being reproduced on the printing device 102.

For example, the printing device 102 may receive a request to reproduce the document 108. The document 108 may include one or more pages. Each page may include text, images, or a combination thereof. The document 108 may be an electronic document transmitted from an endpoint device (e.g., the endpoint device 106) or a physical copy that is placed in the printing device 102 to copy or scan. In other words, reproduction of the document 108 may include printing, scanning, copying, and the like.

In one embodiment, the printing device 102 may have a configurable setting to turn on or off a security mode. When the security mode is turned on or enabled, the printing device 102 may generate a perceptual hash of the document 108. The perceptual hash of the document 108 may be transmitted to the server 104 to ensure that no secure data is contained in the document 108. In one embodiment, the printing device 102 may always have the security mode enabled such that all documents 108 are analyzed to determine that no secure data is contained in the documents 108.

In one embodiment, the printing device 102 may include a processor 118, a memory 120, and a perceptual hash engine 124. The processor may execute instructions stored in the memory 120. The memory 120 may be any type of non-transitory computer readable memory such as a hard disk drive, a random access memory (RAM), an external disk drive, solid state drive, and the like.

It should be noted that the printing device 102 has been simplified for ease of explanation. The printing device 102 may include additional components that are not shown. For example, the printing device 102 may include a communication interface, a wireless radio, paper trays, a print path, a marking engine, a user interface, a display, input/output devices, and the like.

In one embodiment, the perceptual hash engine 124 may be executed by the processor 118 to generate a perceptual hash of document 122. The perceptual hash of document 122 may be the perceptual hash of the document 108 generated by the perceptual hash engine 124. In other words, the printing device 102 may be modified or specially configured to include the ability to locally generate a perceptual hash of the document 108.

The perceptual hash of document 122 may be generated in a similar way that the perceptual hash of secure data 110 is generated, as discussed above. In one embodiment, the perceptual hash of the document 122 may include a perceptual hash of each page of the document 108.

The perceptual hash of document 122 may be temporarily stored in the memory 120. The memory 120 may be a secure memory such as local secure circular list. The secure memory may be a partitioned portion of the memory 120 or a memory device that is separate from the memory 120.

The perceptual hash of document 122 may be stored temporarily until the server 104 verifies that the document 108 does not contain any secure data. In other words, no portion of the document 108 is reproduced (e.g., no copy of the document 108 is outputted from the printing device 102) until a control signal is received from the server 104. Thus, the operation of the printing device 102 may also be modified to rely on a control signal from the remotely located server 104 before completing a reproduction operation, unlike current printing devices.

In one embodiment, a copy of the perceptual hash of document 122 may be transmitted to the server 104 for analysis to see if the document 108 contains any secure data. In other words, the copy of the perceptual hash of document 122 that is transmitted may be identical to the perceptual hash of document 122 stored in the memory 120. In one example, each perceptual hash of secure data 110 stored in the perceptual hash list 116 may be compared to perceptual hash of document 122.

In one embodiment, the perceptual hash of document 122 may include a perceptual hash for each page of the document 108 and perceptual hash for each page of the document 108 may be transmitted to server 104 and compared one page at a time. In another embodiment, the perceptual hash of document 122 may include the perceptual hash of all pages of the document 108 and all pages may be compared simultaneously by the server 104.

In one embodiment, the server 104 may compare the perceptual hash of document 122 to perceptual hashes of secure data stored in a perceptual hash list 116 in the server 104. In one example, a match may be detected when a predefined percentage of a sequence of values of one or more of the perceptual hash of the secure data 110 in the perceptual hash list 116 matches a sequence of values of the perceptual hash of document 122. For example, the predefined percentage may be 90%. An example of the perceptual hash of the secure data 110 may be 1100011000. A portion of the perceptual hash of document 122 may be 0100011000. Thus, the portion of the document 108 with the perceptual hash of 0100011000 may be determined to match the perceptual hash 1100011000 of the perceptual hash of secure data 110.

It should be noted that the predefined percentage is provided as an example. In other words, the predefined percentage may be any value in accordance with a desired application. For example, if tighter security is required the predefined percentage may be lower (e.g., 70% or 80%) to catch a broader range of potential matches. If less security is required the predefined percentage may be higher (e.g., 99% or 100%) to allow more documents to be reproduced.

In one embodiment, a sliding window may be used to perform the comparison. For example, the perceptual hash of secure data 110 may include 20 bits. The perceptual hash of document 122 may include 1000 bits for a single page. Thus, a sliding window of the size of the perceptual hash of secure data 110 (e.g., 20 bits) may be used to examine the perceptual hash of each page of the document 108.

In one embodiment, when at least one match is found by the server 104, the server 104 may send a control signal to the printing device 102 to halt reproduction of the document 108. In other words, no portion of the document 108 is reproduced and the request to reproduce the document 108 is stopped or denied.

In one embodiment, in response to the control signal from the server 104, the printing device 102 may generate a security event and create a security log. The security log may include a date, a time, a user (e.g., if a user is required to log into the printing device 102), and an image of the page or pages of the document 108 that contained the secure data. In one example, the security log may be transmitted back to the server 104. The security log may be encrypted with a public key of the server 104 before transmission for security. In addition, the printing device 102 may delete the copy of the perceptual hash of document 122 that is temporarily stored in the memory 120.

In one embodiment, when no match is found by the server 104, the server 104 may send a control signal to the printing device 102 to indicate that reproduction of the document 108 is authorized. As a result, the printing device 102 may continue with the requested operation to generate a reproduction of the document 108 (e.g., printing, scanning, or copying).

Thus, the present disclosure provides a printing device 102 that is modified to operate in cooperation with the server 104. The printing device 102 may work with the server 104 to automatically analyze documents 108 and ensure that no secure data is reproduced by the printing device 102.

Figure 2:
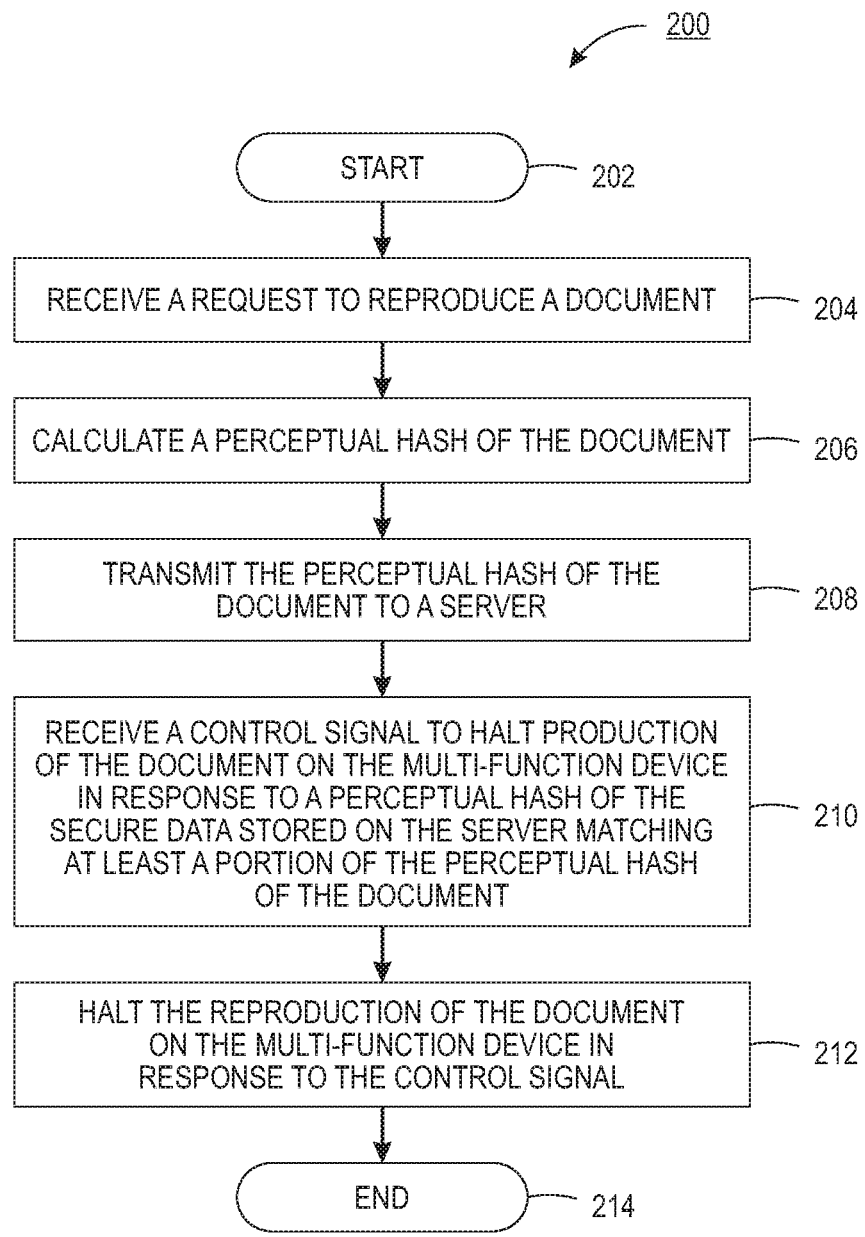
FIG. 2 illustrates an example flowchart of one embodiment of a method for preventing reproduction of secure data on a multi-function device.
Figure 4:
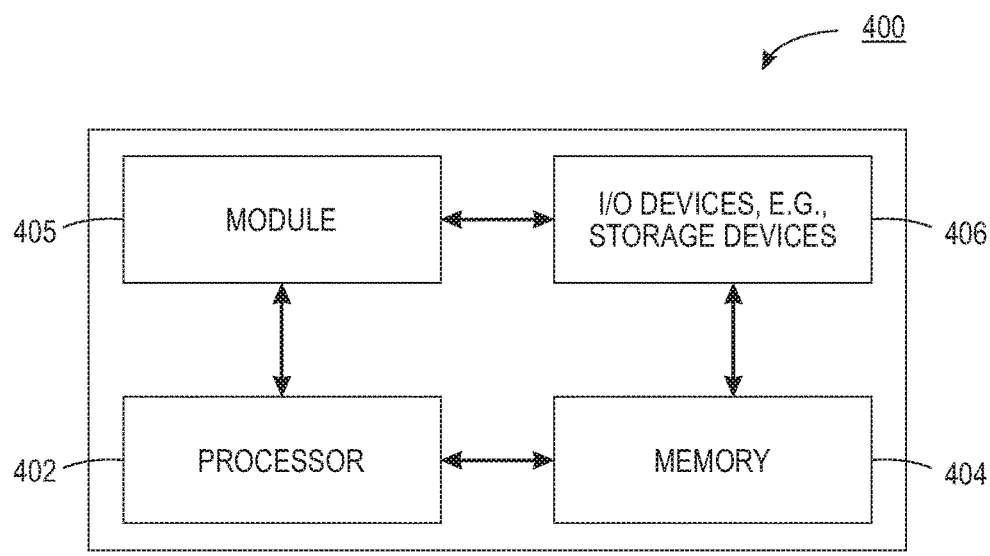
FIG. 4 illustrates a high-level block diagram of a computer suitable for use in performing the functions described herein.

FIG. 2 illustrates a flowchart of a method 200 for preventing reproduction of secure data on a multi-function device. In one embodiment, the method 200 may be performed by the MFD 102 or a computer as illustrated in FIG. 4 and discussed below.

The method 200 begins at block 202. At block 204, the method 200 receives a request to reproduce a document. For example, the document may be a plurality of pages of text, images, or a combination of both text and images. The document may be a physical document to be reproduced on the MFD. For example, the document may be already printed on paper, or any other type of print media, and the document may be placed in the MFD for scanning, copying, or printing.

In another example, the document may be sent electronically from an endpoint device. For example, a user on an endpoint device may select an electronic document for printing on the MFD and send an electronic copy of the document for printing.

At block 206, the method 200 calculates a perceptual hash of the document. In one embodiment, the perceptual hash may be calculated when the MFD is running in a security mode. For example, the security mode may be turned on and off on the MFD depending on whether the MFD should automatically detect secure data and prevent the reproduction of the secure data.

The perceptual hash of the document may be calculated as described above. The perceptual hash may be calculated for each page of the document. In one embodiment, the perceptual hash of each page of the document may be temporarily stored in secure memory on the MFD. For example, the secure memory may be a secure circular list in the MFD.

At block 208, the method 200 transmits the perceptual hash of the document to a server. In one embodiment, the server may be a preconfigured content security back-end system (CSBES). The CSBES may be remotely located from the MFD. The MFD may establish a secure wireless or wired communication path to the CSBES. The perceptual hash of the document may be transmitted over the communication path to the CSBES.

In one embodiment, the blocks 206 and 208 may be repeated for each page of the document. For example, if the document has two pages, the perceptual hash of the first page may be calculated and the perceptual hash of the first page may be transmitted. Then the perceptual hash of the second page may be calculated and the perceptual hash of the second page may be transmitted. In another embodiment, the perceptual hash of all pages of the document may be first calculated, and then the perceptual hash of all pages of the document may be transmitted to the CSBES at the same time.

At block 210, the method 200 receives a control signal to halt reproduction of the document on the multi-function device in response to a perceptual hash of the secure data stored on the server matching at least a portion of the perceptual hash of the document. For example, the server, or CSBES, may compare the perceptual hash of the document, or each page of the document, to perceptual hashes of secure data stored in a perceptual hash list in the server.

In one example, a match may be detected when a predefined percentage of a sequence of values of the perceptual hash of the secure data matches a sequence of values of the perceptual hash of the document. For example, the predefined percentage may be 90%. The perceptual hash of one of the secure data may be 1100011000. A portion of the perceptual hash of the document may be 0100011000. Thus, the portion of the document with the perceptual hash of 0100011000 may be determined to match the perceptual hash 1100011000 of the secure data.

It should be noted that the predefined percentage is provided as an example. In other words, the predefined percentage may be any value in accordance with a desired application. For example, if tighter security is required the predefined percentage may be lower (e.g., 70% or 80%) to catch a broader range of potential matches. If less security is required the predefined percentage may be higher (e.g., 99% or 100%) to allow more documents to be reproduced.

In one embodiment, a sliding window may be used to perform the comparison. For example, the perceptual hash of the secure data may include 20 bits. A page of the document may include 1000 bits. Thus, a sliding window of the size of the perceptual hash of the secure data (e.g., 20 bits) may be used to examine the perceptual hash of each page of the document.

At block 212, the method 200 halts the reproduction of the document on the multi-function device in response to the control signal. In other words, in response to the control signal, the MFD may prevent the document from being reproduced in any way (e.g., prevents scanning, copying, or printing). In one embodiment, a security event may be created and logged by the MFD.

In one embodiment, the security log may include a date, a time, a user (e.g., if a user is required to log into the MFD), and an image of the page or pages of the document that contained the secure data. In one example, the security log may be transmitted back to the server or CSBES. The security log may be encrypted with a public key of the CSBES before transmission for security.

As a result, the MFD may be modified to automatically detect secure data in a document and prevent reproduction of the secure data. In one embodiment, part of the control of the MFD may be controlled by the server or CSBES. Thus, the MFD of the present disclosure may work with the CSBES to provide an automated system to detect secure data and prevent reproduction of the secure data without any user intervention. The method 200 ends at block 214.

Figure 3:
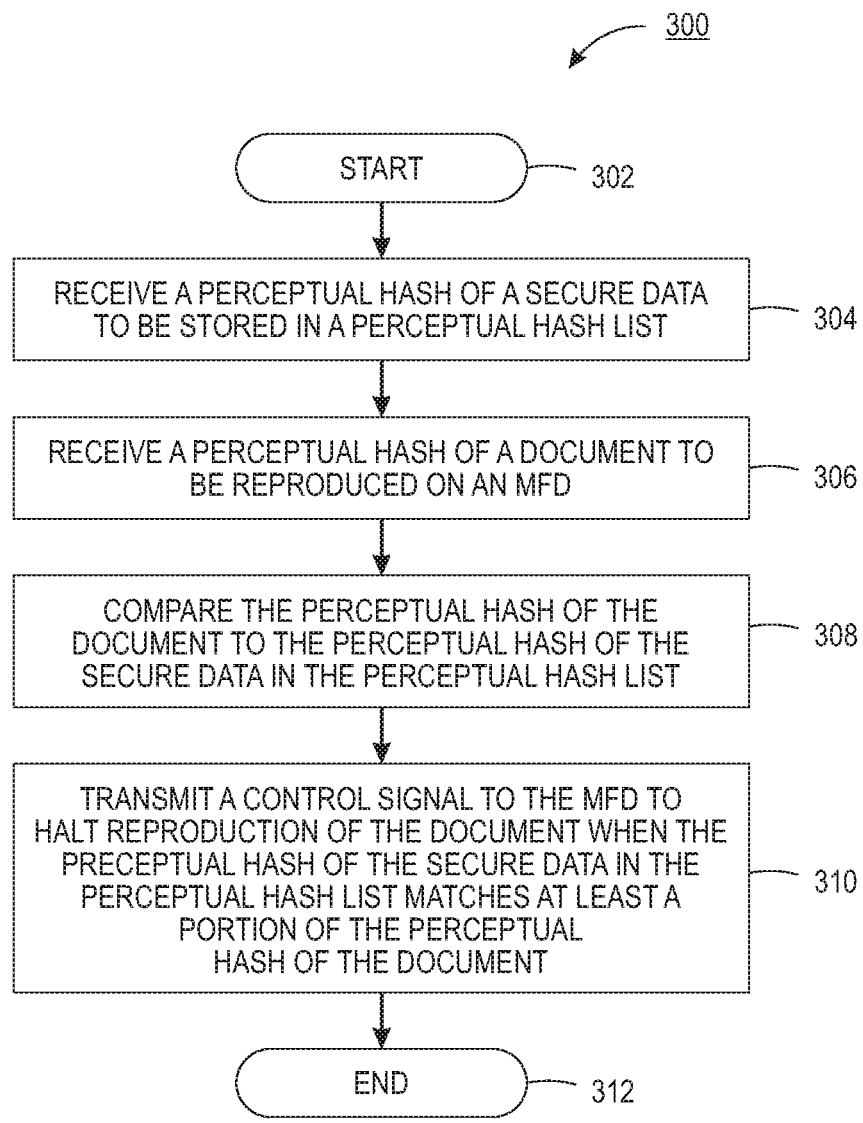
FIG. 3 illustrates an example flowchart of another embodiment of a method for preventing reproduction of secure data on a multi-function device.

FIG. 3 illustrates a flowchart of a method 300 for preventing reproduction of secure data on a multi-function device. In one embodiment, the method 300 may be performed by CSBES 104 or a computer as illustrated in FIG. 4 and discussed below.

The method 300 begins at block 302. At block 304, the method 300 receives a perceptual hash of secure data to be stored in a perceptual hash list. For example, the perceptual hash of the secure data may be created by a user on an endpoint device. The CSBES may collect the perceptual hash for a plurality of different secure data received from different endpoint devices and store the perceptual hashes in the perceptual hash list. The perceptual hash for each secure data can be generated or calculated, as discussed above.

In one embodiment, the perceptual hash of the secure data may be converted or compressed to save storage space. For example, the bits of the perceptual hash may be converted into a hexadecimal format, or any other memory space saving format for storage.

In one embodiment, each perceptual hash stored in the perceptual hash list may be encrypted with a public key of the CSBES. For example, the user of the endpoint device that creates the perceptual hash may have the public key of the CSBES. The perceptual hash of the secure data may be encrypted with the public key before being transmitted to the CSBES.

At block 306, the method 300 receives a perceptual hash of a document to be reproduced on an MFD. In one embodiment, the CSBES may manage a plurality of different MFDs at a plurality of different geographic locations. The CSBES may receive the perceptual hash of the document from one of the MFDs.

In one embodiment, the perceptual hash of the document may include the perceptual hash of each page of the document. For example, the document may be a plurality of pages. The MFD may calculate the perceptual hash of each page of the document and transmit the perceptual hash of each page of the document to the CSBES.

At block 308, the method 300 compares the perceptual hash of the document to the perceptual hash of the secure data stored in the perceptual hash list. In one embodiment, the comparing may be performed for each page of the document if the document comprises multiple pages, as noted in block 306.

For example, a sequence of bits of the perceptual hash of the secure data may be compared to a sequence of bits of the perceptual hash of the document. The comparison may be performed to determine of the sequence of bits of the perceptual hash of the secure data match within a predefined threshold, or detection range, of any portion of the sequence of the perceptual hash of the document.

In one embodiment, a sliding window may be used to perform the comparison. For example, the perceptual hash of the secure data may include 20 bits. A page of the document may include 1000 bits. Thus, a sliding window of the size of the perceptual hash of the secure data (e.g., 20 bits) may be used to examine the perceptual hash of each page of the document.

At block 310, the method 300 transmits a control signal to the MFD to halt reproduction of the document when the perceptual hash of the secure data in the perceptual hash list matches at least a portion of the perceptual hash of the document. In one example, a match may be detected when a predefined percentage of a sequence of values of the perceptual hash of the secure data matches a sequence of values of the perceptual hash of the document. For example, the predefined percentage may be 90%. The perceptual hash of one of the secure data may be 1100011000. A portion of the perceptual hash of the document may be 0100011000.

Thus, the portion of the document with the perceptual hash of 0100011000 may be determined to match the perceptual hash 1100011000 of the secure data.

It should be noted that the predefined percentage is provided as an example. In other words, the predefined percentage may be any value in accordance with a desired application. For example, if tighter security is required the predefined percentage may be lower (e.g., 70% or 80%) to catch a broader range of potential matches. If less security is required the predefined percentage may be higher (e.g., 99% or 100%) to allow more documents to be reproduced.

In one example, when a match is found and the MFD is halted from reproducing the document, the MFD may transmit a security log to the CSBES. The security log may include a date, a time, a user (e.g., if a user is required to log into the MFD), and an image of the page or pages of the document that contained the secure data. The security log may be encrypted with the public key of the CSBES for security.

In one embodiment, if no match is found, the CSBES may send a control signal indicating that no match was found and that the document may be reproduced. Thus, the MFD may hold the document for reproduction until either a control signal indicating a match was found or a control signal indicating that no match was found is received from the CSBES. At block 312, the method 300 ends.

It should be noted that although not explicitly specified, one or more blocks, functions, or operations of the methods 200 and 300 described above may include a storing, displaying and/or outputting block as required for a particular application. In other words, any data, records, fields, and/or intermediate results discussed in the methods can be stored, displayed, and/or outputted to another device as required for a particular application. Furthermore, blocks, functions, or operations in FIGS. 2 and 3 that recite a determining operation, or involve a decision, do not necessarily require that both branches of the determining operation be practiced. In other words, one of the branches of the determining operation can be deemed as an optional block.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for preventing reproduction of secure data on a multi-function device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware deployed on a hardware device, a computer or any other hardware equivalents (e.g., the MFD 102 or the CSBES 104). For example, computer readable instructions pertaining to the method(s) discussed above can be used to configure a hardware processor to perform the blocks, functions and/or operations of the above disclosed methods. In one embodiment, instructions and data for the present module or process 405 for preventing reproduction of secure data on a multi-function device (e.g., a software program comprising computer-executable instructions) can be loaded into memory 404 and executed by hardware processor element 402 to implement the blocks, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for preventing reproduction of secure data on a multi-function device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for preventing reproduction of secure data on a multi-function device, comprising:
   receiving, by a processor of the multi-function device, a request to reproduce a document;
   calculating, by the processor, a perceptual hash of the document;
   transmitting, by the processor, the perceptual hash of the document to a server;
   receiving, by the processor, a control signal to halt reproduction of the document on the multi-function device in response to a perceptual hash of the secure data stored on the server matching at least a portion of the perceptual hash of the document, wherein the perceptual hash of the document is compared to the perceptual hash of the secure data using a sliding window of a predefined number of bits that is equal to a number of bits of the perceptual hash; and
   halting, by the processor, the reproduction of the document on the multi-function device in response to the control signal.

2. The method of claim 1, wherein the reproduction comprises at least one of: printing, copying, or scanning.

3. The method of claim 1, wherein the calculating and the transmitting is repeated for each page of the document.

4. The method of claim 1, wherein the perceptual hash of the secure data is generated via an application on an endpoint device and transmitted to the server.

5. The method of claim 4, wherein the perceptual hash of the secure data is encrypted with a public key in the server.

6. The method of claim 1, further comprising:
   creating, by the processor, a reproduction of the document;

storing, by the processor, the reproduction of the document temporarily; and deleting, by the processor, the reproduction of the document in response to the receiving of the control signal.

7. The method of claim 1, wherein the secure data comprises at least one of: text, an image, or a combination thereof.

8. The method of claim 1, further comprising:

logging, by the processor, a security event in response to the receiving the control signal.

9. The method of claim 1, wherein the perceptual hash of the secure data matches the perceptual hash of the document when a predefined percentage of a sequence of values of the perceptual hash of the secure data matches a sequence of values of the perceptual hash of the document.

10. A non-transitory computer-readable medium storing a plurality of instructions which, when executed by a processor of a multi-function device, cause the processor to perform operations for preventing reproduction of secure data on the multi-function device e, the operations comprising:

receiving a request to reproduce a document;

calculating a perceptual hash of the document;

transmitting the perceptual hash of the document to a server;

receiving a control signal to halt reproduction of the document on the multi-function device in response to a perceptual hash of the secure data stored on the server matching at least a portion of the perceptual hash of the document, wherein the perceptual hash of the document is compared to the perceptual hash of the secure data using a sliding window of a predefined number of bits that is equal to a number of bits of the perceptual hash; and halting the reproduction of the document on the multi-function device in response to the control signal.

11. The non-transitory computer-readable medium of claim 10, wherein the reproduction comprises at least one of: printing, copying, or scanning.

12. The non-transitory computer-readable medium of claim 10, wherein the calculating and the transmitting is repeated for each page of the document.

13. The non-transitory computer-readable medium of claim 10, wherein the perceptual hash of the secure data is generated via an application on an endpoint device and transmitted to the server.

14. The non-transitory computer-readable medium of claim 13, wherein the perceptual hash of the secure data is encrypted with a public key in the server.

15. The non-transitory computer-readable medium of claim 10, further comprising:

creating a reproduction of the document;

storing the reproduction of the document temporarily; and deleting the reproduction of the document in response to the receiving of the control signal.

16. The non-transitory computer-readable medium of claim 10, wherein the secure data comprises at least one of: text, an image, or a combination thereof.

17. The non-transitory computer-readable medium of claim 10, further comprising:

logging, by the processor, a security event in response to the receiving the control signal.

18. The non-transitory computer-readable medium of claim 10, wherein the perceptual hash of the secure data matches the perceptual hash of the document when a predefined percentage of a sequence of values of the perceptual hash of the secure data matches a sequence of values of the perceptual hash of the document.

19. A method for preventing reproduction of secure data on a printing device, comprising:

receiving, by a processor of the printing device, a request to print a document;

calculating, by the processor, a perceptual hash of each page of the document;

transmitting, by the processor, the perceptual hash of the each page of the document to a content security back-end system (CSBES);

receiving, by the processor, a control signal to halt printing of the document on the printing device in response to a perceptual hash of the secure data stored on the CSBES matching at least a portion of the perceptual hash of at least one page of the document, wherein the perceptual hash of the at least one page of the document is compared to the perceptual hash of the secure data using a sliding window of a predefined number of bits that is equal to a number of bits of the perceptual hash; and halting, by the processor, the printing of the document on the printing device in response to the control signal.

20. The method of claim 19, the control signal to halt printing of the document comprises an identification of one or more pages of the document that contain the secure data based on the perceptual hash of the secure data stored on the CSBES matching the at least a portion of the perceptual hash of the at least one page of the document.

* * * * *